United States Patent [19]

Shinagawa et al.

[11] Patent Number: 5,463,831
[45] Date of Patent: Nov. 7, 1995

[54] WEATHER STRIP FOR MOTOR VEHICLE

[75] Inventors: Masatoshi Shinagawa; Hideyuki Hashimoto, both of Aichi, Japan

[73] Assignee: Toyoda Gosei Co., Ltd., Nishikasugai, Japan

[21] Appl. No.: 73,502

[22] Filed: Jun. 9, 1993

[30] Foreign Application Priority Data

Jun. 11, 1992 [JP] Japan .................. 4-040058 U

[51] Int. Cl.⁶ ........................................... B60J 1/16
[52] U.S. Cl. ................................. 49/377; 49/498.1
[58] Field of Search ................... 49/374, 377, 495.1, 49/475.1, 498.1

[56] References Cited

U.S. PATENT DOCUMENTS

| | | |
|---|---|---|
| 3,742,649 | 7/1973 | Dochnahl . |
| 4,381,115 | 4/1983 | Ko ........................ 49/498.1 X |
| 4,702,039 | 10/1987 | Bocchinfuso ............ 49/498.1 X |
| 5,085,005 | 2/1992 | Yasukawa et al. . |
| 5,199,760 | 4/1993 | Vering .................... 49/377 X |
| 5,261,188 | 11/1993 | Vaughan ................. 49/377 |

FOREIGN PATENT DOCUMENTS

| | | | |
|---|---|---|---|
| 1929430 | 12/1970 | Germany | 49/498.1 |
| 2401465 | 7/1975 | Germany | 49/498.1 |
| 3223387 | 12/1983 | Germany | 49/498.1 |
| 53-153623 | 12/1978 | Japan . | |
| 55-59015 | 5/1980 | Japan . | |
| 2216163 | 10/1989 | United Kingdom | 49/489.1 |

*Primary Examiner*—Peter M. Cuomo
*Assistant Examiner*—Jerry Redman
*Attorney, Agent, or Firm*—Cushman Darby & Cushman

[57] ABSTRACT

It is an object of the present invention to provide such a weather strip that a noise is prevented from being caused as a window pane is moved up and down in contact with the strip. The weather strip 9 according to the present invention includes a base portion 11, a seal lip 12, and a seal portion 14 having an internal opening 13. The pane contact part 20 of the seal portion 14 is made larger in thickness than the pane non-contact part 21 thereof. The pane contact part 20 is bent at the bent portion 20a thereof. The surface R of the bent portion 20a, with which the window pane 8 comes into contact, is a curved surface nearly unchanged in radius of curvature. The strip 9 has a first groove 22 inside a first bend point 18, and a second groove 23 inside a second bend point 19. The second groove 23 is larger in depth but smaller in width than the first groove 22. When the window pane 8 is moved up and down in contact with the weather strip 9, the pane contact part 20 of the seal portion 14 is hardly deformed but swung up and down about the second bend point 19. The pane contact surface R of the bent portion 20a is so curved that the area of contact thereof with the pane 8 is nearly unchanged despite the vertical movement thereof.

7 Claims, 4 Drawing Sheets

WEATHER STRIP FOR MOTOR VEHICLE

BACKGROUND OF THE INVENTION

The present device relates to a weather strip provided at the upper edge of the panel of the door of a motor vehicle so as to seal the gap between the vertically movable window pane of the door and the panel.

A conventional weather strip 31 is secured with a clip 34 and a calked member 35 to a belt 33 fastened to the outer panel 32 of the door of a motor vehicle, as shown in FIG. 5. The weather strip 31 includes a seal lip 37 for sealing the gap between the window pane 36 of the door and the belt 33, and a seal portion 39 having an internal opening 38. The seal portion 39 includes a bent part 40 constituting the top of the portion, a pane contact part 41, on which the window pane 36 slides at the time of the vertical movement thereof, and a pane non-contact part 42, with which the pane comes into contact. At the above-mentioned time, the pane 36 comes into contact with the pane contact part 41 so that the part is deformed to push the pane to seal the gap between the pane and the belt 33. Such weather strips were disclosed in the Japan Patent Application (OPI) No. 59015/80 and the Japan Utility Model Application (OPI) No. 153623/78 (the term "OPI" as used herein means an "unexamined published application").

Since the pane contact part 41 of the seal portion 39 of the conventional weather strip 31 is easily deformable, the part is likely to be deformed in a wavy manner at the time of the vertical movement of the window pane 36 as shown in FIG. 6. This problem tends to often take place particularly when the weather strip 31 is secured to the belt 33 so that the strip is displaced from a prescribed position toward the outer panel 32 of the door, namely, rightward as to FIG. 6. In that case, the pushing or sealing force of the pane contact part 41 does not equally act to the window pane 36, so that a noise is likely to be generated as the pane slides on the part.

SUMMARY OF THE INVENTION

The present device was made in order to solve the above-mentioned problem. Accordingly, it is an object of the device to provide a weather strip which is for a motor vehicle and is such that a noise is prevented from being caused as the window pane of the vehicle is moved up and down in contact with the strip.

The weather strip includes a base portion secured to the panel of the door of the motor vehicle at the upper edge of the panel, a seal lip extending obliquely up from the top of the base portion, and a hollow weal portion extending obliquely up from the base portion under the lip, so that the window pane of the door can be slid up and down in contact with the lip and the seal portion to seal the gap between the pane and the upper edge of the panel. The strip is characterized in that the seal portion includes a pane contact part located to face the window pane, and a pane non-contact part facing the base portion; the pane contact part has a bent portion having a curved surface, with which the window pane comes into contact; and the pane contact part is higher in rigidity than the pane non-contact part.

When the window pane is slid up and down in contact with the pane contact part of the seal portion of the weather strip provided in accordance with the present device, stress is caused in the seal portion. At that time, since the pane contact part is higher in rigidity than the pane non-contact part, the former is hardly deformed but the latter is flexed. The pane contact part including the bent portion remains in the original form of the part as the window pane is moved up and down in contact with the part. Since the window pane comes into contact with the curved surface of the bent portion as the pane is moved up and down, the area of contact of the bent portion with the pane is nearly unchanged despite the vertical movement thereof. For that reason, the elastic pushing force of the seal portion always equally acts to the window pane at the time of the vertical movement thereof so that the noise is prevented from being caused by the contact of the window pane with the curved surface of the bent portion.

DETAILED DESCRIPTION OF THE PREFERRED EMBODIMENTS

An embodiment of the present device is hereafter described with reference to the drawings attached hereto.

Figure 1:
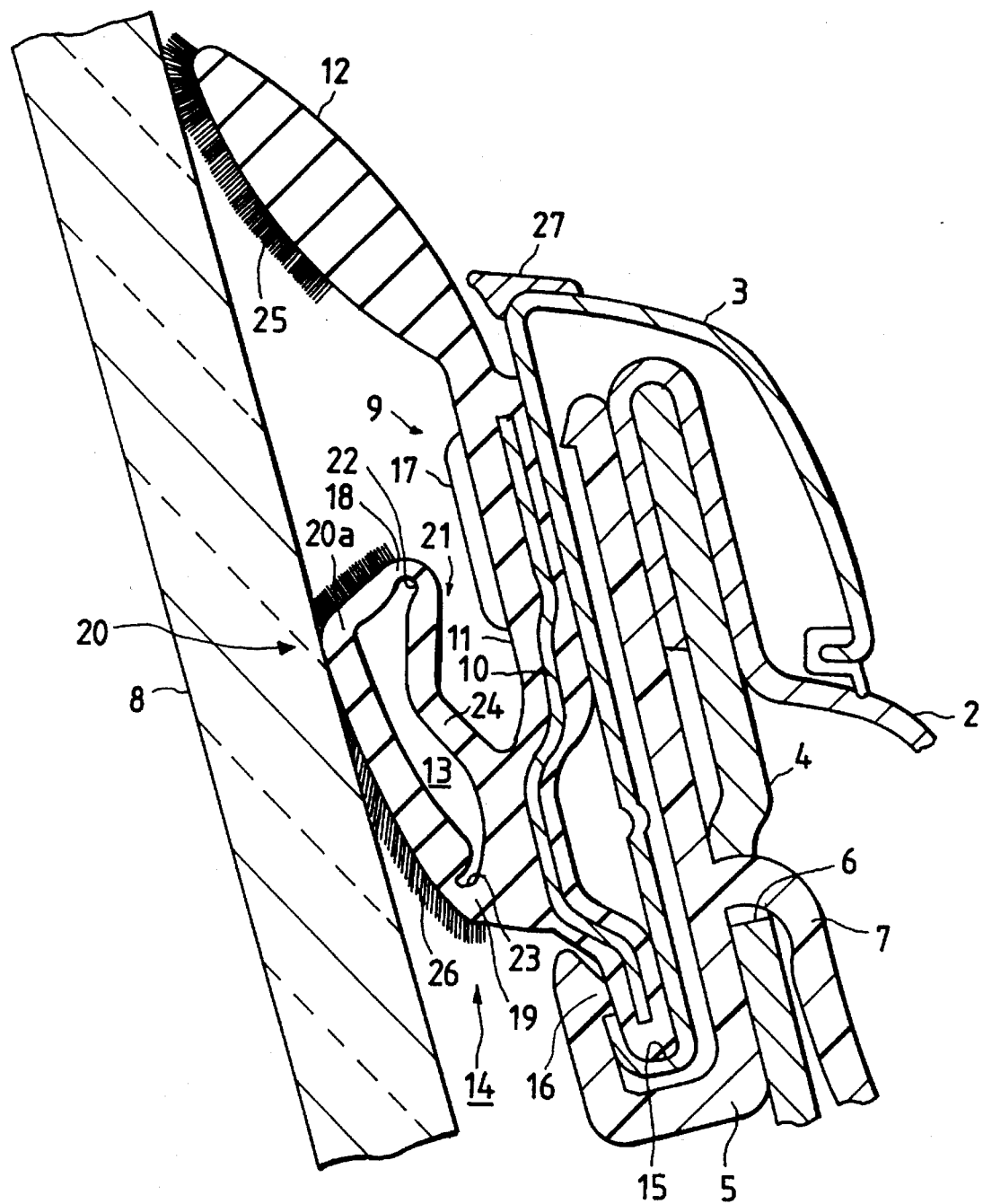
FIG. 1 is a cross-sectional view of a weather strip which is an embodiment of the present device in the state that a window pane is moved up.
Figure 2:
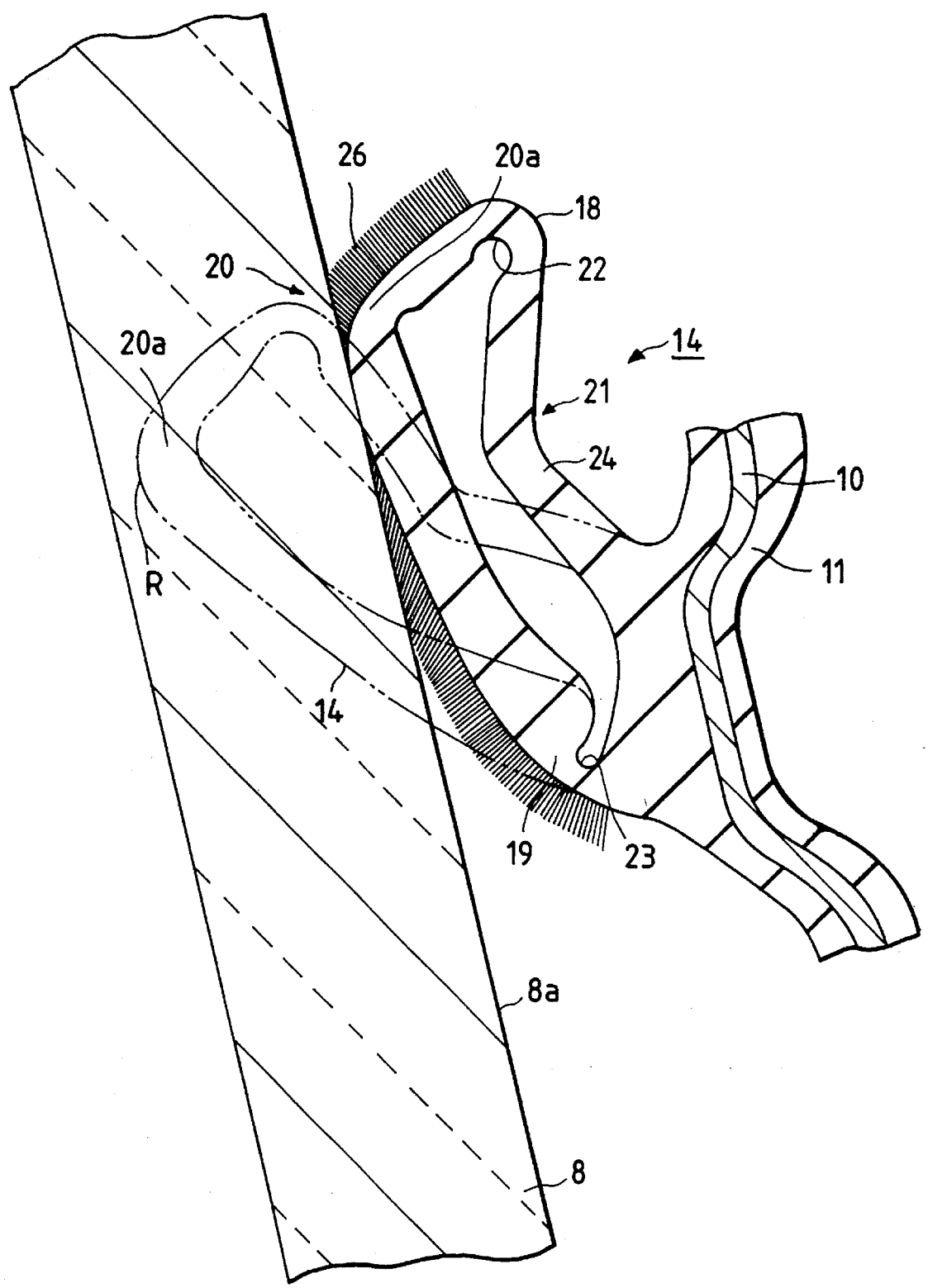
FIG. 2 is an enlarged cross-sectional view of the seal portion of the strip in the state that the pane is moved up.
Figure 3:
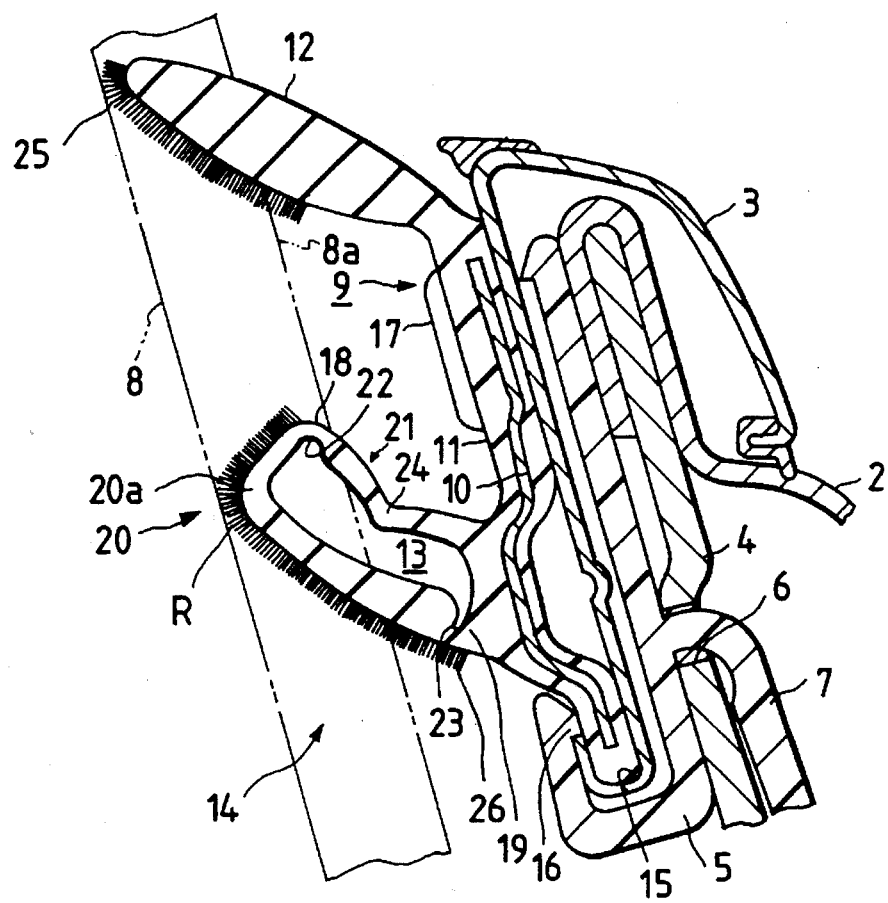
FIG. 3 is a cross-sectional view of the strip along a line A shown in FIG. 4, and shows the strip in the state that the pane is moved down.
Figure 4:
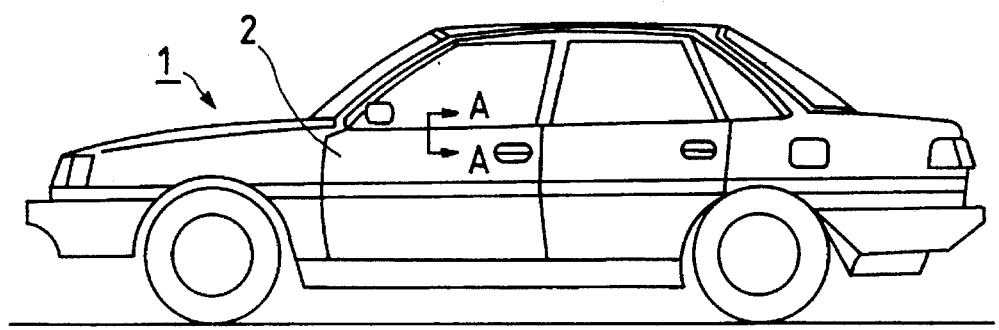
FIG. 4 is a side view of a motor vehicle including the strip.
Figure 5:
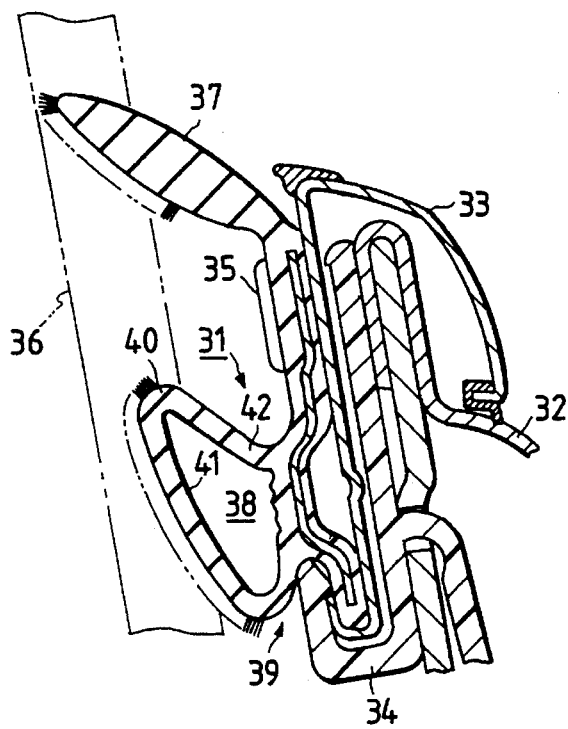
FIG. 5 is a cross-sectional view of a conventional weather strip.
Figure 6:
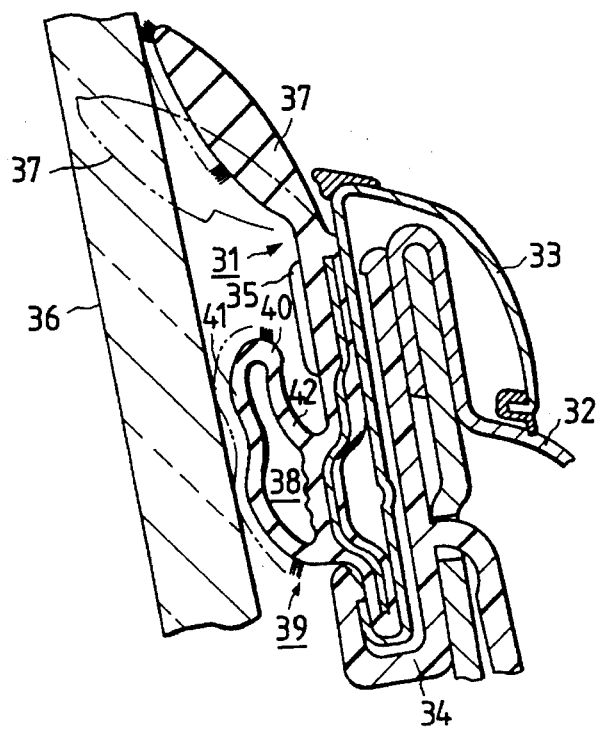
FIG. 6 is a cross-sectional view of the conventional strip to illustrate the operation thereof.

FIGS. 1, 2 and 3 show a weather strip 9 which is the embodiment. FIG. 4 is a side view of a motor vehicle 1 including the weather strip 9. FIG. 3 is a sectional view of the door of the vehicle 1 along a line A shown in FIG. 4. A belt 3 made of a stainless steel is secured to the outer panel 2 of the door at the upper edge of the panel. A reinforcing member 4 is provided inside the panel 2 so that the panel is reinforced by the member. A clip 5 made of a resin is attached to the reinforcing member 4 by fitting the attached portion 7 of the clip in the through hole 6 of the member. The window pane 8 of the door is supported at a prescribed distance from the belt 3 so that the pane can be moved up and down in contact with the weather strip 9.

The strip 9 is secured to the belt 3 in order to seal the gap between the belt and the window pane 9. The strip 9 includes a base portion 11 having a core 10, a seal lip 12 molded integrally with the base portion and extending obliquely up from the top of the base portion, and a hollow seal portion 14 molded integrally with the base portion under the lip. The base portion 11 is fitted at the bottom thereof in a groove 15 constituted by the belt 3 at the lower edge thereof, and is held thereon by the lower projection of 16 of the clip 5. The base portion 11 is secured at the middle-height part thereof to the belt 3 by a calked member 17. The seal lip 12 projects obliquely up from the base portion 11 so that the outer side 8a of the window pane 8 comes into contact with the lip at the top thereof as the pane is moved up.

The hollow seal portion 14 includes a first bend point 18 at the top of the portion, a second bend point 19 at the bottom of the portion, a pane contact part 20 located to face the window pane 8, and a pane non-contact part 21 facing the base portion 11 and adjoining the pane contact part at both the bend points. The pane contact part 20 is larger in thickness than the pane non-contact part 21, and has the maximum thickness near the second bend point 19. The pane contact part 20 is obtusely bent at the bent portion 20a thereof, with which the window pane 8 comes into contact. The pane contact surface R of the bent portion 20a is a curved surface nearly unchanged in radius of curvature. The seal portion 14 has a first groove 22 inside the first bend point 18 so that the groove makes it easy to bend the portion at the point. The seal portion has a second groove 23 inside the second bend point 19. The second groove is larger in depth but smaller in width than the first groove. The direction of the depth of the second groove 23 is nearly perpendicular to that of the height of the pane contact part 20 under the bent portion 20a thereof. As a result, the pane contact part 20 is swung up and down mainly about the second bend point 19 as the window pane 8 is moved up and down in contact with the part. The pane non-contact part 21 is obtusely bent at the third bend point 24 of the seal portion 24 so that the part projects toward the window pane 8 at the point. The parts of the seal lip 12 and the seal portion 14, with which the window pane 8 comes into contact as it is moved up and down, have hairs 25 and 26 planted in the surfaces of the parts so as to reduce the resistances thereof to the sliding of the pane thereon.

A cover 27 is provided on the belt 3 at the top thereof.

The operation of the weather strip 9 is described in detail below. When the window pane 8 is moved up and down in contact with the strip 9 as shown in FIG. 1, the seal lip of the strip is slightly bent at the top of the lip outward or rightward as to FIG. 1 so that the seal lip pushes the pane at the top of the lip by the reactive force of the lip due to the bending, to seal the gap between the pane and the belt 3. At that time, since the pane contact part 20 of the seal portion 14 of the strip is larger in thickness over and under the bent portion 20a of the part than the pane non-contact part 21 of the seal portion so as to be higher in rigidity than the latter, the pane contact part is hardly deformed although stress is caused in the part. For that reason, the seal portion 14 is bent at the first, the second and the third bend points 18, 19 and 24, as shown in FIG. 1. At the time of the vertical movement of the window pane 8, the pane contact part 20 is swung up and down about the second bend point 19 as the part remains in the original form thereof. Along with the swinging, the point of contact of the bent portion 20a of the part 20 with the pane 8 is moved up and down. Since the pane contact surface R of the bent portion 20a is such a curved surface that the area of contact of the portion with the pane 8 is nearly unchanged despite the vertical movement of the pane, the elastic pushing force of the seal portion 14 always equally acts to the pane despite the vertical movement thereof. For that reason, a noise is not caused by the contact of the window pane 8 with the pane contact surface R of the bent portion 20a as the pane is moved up and down. Since the second groove 23 of the seal portion 14 is made larger in depth but smaller in width than the first groove 22 thereof in order to swing the pane contact part 20 up and down mainly about the second bend point 19 as the pane 8 is moved up and down, the center of the swinging is kept in nearly the same location so as to more securely maintain the equal action of the elastic pushing force of the seal portion to the pane to make it less likely for the noise to be caused by the contact of the pane with the seal portion.

The present device is not confined to the above-described embodiment, but may be embodied or practiced in other various ways without departing from the spirit or essential character of the device. For example, although the weather strip 9 is secured to the belt 3 by the clip 5 and the calked member 17, the strip may be secured to the belt by other means such as an adhesive and pairs of bolts and nuts or be molded integrally with the belt. Although the seal lip 12 and the seal portion 14 have the hairs 25 and 26 planted in the surfaces of the lip and the portion, they may have other things such as a urethane paint applied to them to constitute their smooth surfaces. Although the strip 9 is secured to the belt 3 at the upper edge of the outer panel 2 of the door, the strip may be disposed at the inner panel of the door. Although the pane contact part 20 is larger in thickness than the pane non-contact part 21, the former may be equal in thickness to the latter but higher in rigidity than it. For that purpose, the former may be made of a material of higher rigidity than the latter.

A weather strip provided for a motor vehicle in accordance with the present device has seal portion including a pane contact part whose bent portion has a curved surface, with which the window pane of the door of the vehicle comes into contact, and a pane non-contact part lower in rigidity than the pane contact part. For that reason, a noise is prevented from being caused as the window pane is moved up and down in contact with the strip. A desirable effect is thus produced.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A weather strip for a motor vehicle comprising:

a base portion secured to a panel of a door of the vehicle at an upper edge of the panel;

a seal lip extending obliquely up from a top of said base portion; and a hollow seal portion extending obliquely up from said base portion under said seal lip in such a manner that a window pane of the door can be slid up and down in contact with said seal lip and said hollow seal portion to seal a gap between the window pane and the upper edge of the panel;

wherein said hollow seal portion includes a pane contact part disposed so as to face the pane, a pane non-contact part facing said base portion, a first bend point at a top of said seal portion, a second bend point at a bottom of said seal portion, said pane non-contact part having a third bend point between said first and second bend points permitting the pane non-contact part to bend toward the window pane even if said hollow seal portion is not in contact with the window pane, said pane contact part has a bent portion having a curved surface with which the pane comes into contact; and said pane contact part is higher in rigidity than said pane non-contact part.

2. A weather strip according to claim 1, wherein said pane contact part is larger in thickness in areas other than said bent portion thereof than a thickness of said pane non-contact part.

3. A weather strip according to claim 2, wherein said pane contact part has a maximum thickness near said second bend point at the bottom of said hollow seal portion.

4. A weather strip according to claim 1, wherein said curved surface of said bent portion is such that an area of contact of said bent portion with the window pane is nearly unchanged despite vertical movement of the window pane in such a manner that an elastic pushing force of the seal portion always acts equally on the window pane despite the vertical movement thereof.

5. A weather strip according to claim 1, wherein said seal portion has a first groove inside said first bend point at the top of said hollow seal portion so that the first groove makes it easy to bend the seal portion at the first bend point.

6. A weather strip according to claim 5, wherein said seal portion has a second groove inside said second bend point.

7. A weather strip according to claim 6, wherein said second groove is larger in depth but smaller in width than the first groove.

* * * * *